United States Patent [19]

Fuchs, Jr.

[11] Patent Number: 5,095,185
[45] Date of Patent: Mar. 10, 1992

[54] MICROWAVE COFFEE MAKER

[75] Inventor: Donald C. Fuchs, Jr., Mentor, Ohio

[73] Assignee: Mr. Coffee, Inc., Bedford Heights, Ohio

[21] Appl. No.: 464,335

[22] Filed: Jan. 12, 1990

[51] Int. Cl.$^5$ .......................... H05B 6/80; A47J 31/02
[52] U.S. Cl. ...................... 219/10.55 E; 219/10.55 F; 99/305; 99/306
[58] Field of Search ...................... 219/10.5 E, 10.55 F, 219/10.55 R; 99/305, 306, DIG. 14 300, 451

[56] References Cited

U.S. PATENT DOCUMENTS

| | | |
|---|---|---|
| 2,176,082 | 10/1939 | Kise . |
| 2,601,067 | 6/1952 | Spencer ........................ 219/10.55 E |
| 2,926,234 | 2/1960 | Palmer . |
| 2,948,618 | 8/1960 | Saint ........................ 99/306 |
| 3,139,344 | 6/1964 | Weisman ........................ 99/306 |
| 3,442,199 | 5/1969 | McGrail ........................ 99/283 |
| 3,587,444 | 6/1971 | Godel et al. ........................ 99/306 |
| 3,589,272 | 6/1971 | Bouladon ........................ 99/295 |
| 3,985,069 | 10/1976 | Cavalluzzi ........................ 99/306 |
| 4,104,957 | 8/1978 | Freedman et al. ........... 219/10.55 E |
| 4,303,196 | 12/1981 | Raines ........................ 99/283 |
| 4,381,696 | 5/1983 | Koral ........................ 219/10.55 E |
| 4,386,109 | 5/1983 | Bowen et al. ............... 219/10.55 E |
| 4,577,080 | 3/1986 | Grossman .................... 219/10.55 E |
| 4,642,443 | 2/1987 | Jorgensen et al. ........... 219/10.55 E |
| 4,721,835 | 1/1988 | Welker ........................ 219/10.55 E |

Primary Examiner—Philip H. Leung
Attorney, Agent, or Firm—D. Peter Hochberg; Mark Kusner; Louis J. Weisz

[57] ABSTRACT

An apparatus for brewing coffee or the like with microwave energy comprising a generally funnel-shaped reservoir having an open upper end, a closed lower end and an aperture near the closed lower end. A removable cover is provided for closing the open upper end. A flange extends outwardly from the reservoir and is operable to position the apparatus over a conventionally-known cup or mug wherein the aperture is disposed over the cup or mug. A valve is provided to control flow of liquid from the reservoir and is operable to allow flow upon the existence of a predetermined condition in the reservoir.

14 Claims, 5 Drawing Sheets

MICROWAVE COFFEE MAKER

FIELD OF THE INVENTION

The present invention relates generally to appliances for brewing coffee, tea, or the like, and more particularly to a device for quickly brewing coffee in a microwave oven.

BACKGROUND OF THE INVENTION

The present invention relates generally to a microwave coffee maker and more particularly to a device for quickly brewing individual servings of coffee. Various devices for brewing coffee in microwave ovens are known. U.S. Pat. Nos. 3,589,272 to Bouladon; 4,104,957 to Freedman et al.; 4,381,696 to Koral; 4,386,109 to Bowen et al.; and, 4,642,443 to Jorgensen et al., each disclose an appliance for brewing coffee or the like in a microwave oven. Each of these appliances, however, is generally directed to brewing large volumes of coffee, and are not convenient for quickly brewing individual servings or small quantities. U.S. Pat. No. 4,721,835 to Welker discloses a single serving microwave brewing cup. The disclosed device is basically comprised of a cup for receiving water and coffee particles and a lid or cover having filtering openings therein. The Welker patent basically discloses a so-called "pot method" method of making coffee in which water and coffee grounds are heated together. With respect to the disclosed device, the coffee and water are placed within the cup and are heated by microwaves. The brewed beverage is poured from the cup through the filtering openings in the cover, the coffee particles being retained in the cup by such filtering openings. While such device is capable of quickly brewing coffee in a microwave oven, several variables affect the strength and flavor of the resultant brewed coffee. More specifically, while the amount of ground coffee and water used within the device will clearly affect the flavor and strength of the brewed coffee, so too will the temperature of the water and the period of time the coffee particles remain immerged in the heated water. In this respect, the device disclosed in the Welker patent provides no inherent means for controlling the brewing time of the coffee once the water has reached a brewing temperature.

The present invention overcomes these and other problems and provides a microwave device for brewing a single serving of coffee or the like wherein the brewed beverage is separated from the flavoring particulate after a predetermined brewing period.

SUMMARY OF THE INVENTION

In accordance with the present invention, there is provided an apparatus for brewing coffee or the like with microwave energy comprising a generally funnel-shaped reservoir having an open upper end, a closed lower end, and an aperture near the closed lower end. A removable cover is provided for closing the open upper end of the reservoir. Flange means extend outwardly from the reservoir and are operable to position the apparatus on the upper edge of a conventionally known cup or mug, the flange means being further operable to position the aperture near the lower end of the reservoir within the cup or mug. Valve means are provided for controlling the flow of liquid from the reservoir through the aperture, the valve means being operable to allow flow through the aperture when a predetermined condition exists within the reservoir.

In accordance with another aspect of the present invention, there is provided a device as described above wherein the valve means includes a bimetallic strip operable to move the valve means to an open position wherein flow is allowed through the aperture when the strip has attained a predetermined temperature.

In accordance with another aspect of the present invention, there is provided an apparatus as described above wherein the lid is dimensioned to seal the reservoir and create a pressurizable chamber therein, and the valve means is biased to a normally closed position obstructing the aperture, the valve means being operable to open when pressure within the chamber has attained a predetermined level.

In accordance with the still further aspect of the present invention, there is provided a device as described above wherein a "lossy material" (i.e. a material which absorbs microwave energy and increases in temperature) is provided in the reservoir to create a "hot spot" at a predetermined location within the reservoir. The hot spot produces localized heating which is operable to create convection currents within the water and particulate matter within the reservoir.

A primary object of the present invention is to provide a device for quickly brewing small amounts of coffee, tea, or the like.

Another object of the present invention is to provide a device as described above for use in the microwave oven.

Another object of the present invention is to provide a device as described above which produces a coffee beverage upon water reaching a predetermined temperature without requiring further manipulation.

A still further object of the present invention is to provide a device as described above wherein water is maintained in contact with the flavoring particulate until the water has attained a predetermined brewing temperature.

A still further object of the present invention is to provide a device as described above which is adapted for use with conventionally known mugs or cups.

A still further object of the present invention is to provide a device as described above which utilizes a "lossy material" to create convection currents to agitate the water and coffee particles during heating.

A still further object of the present invention is to provide a device as described above which utilizes a temperature control valve for maintaining water in contact with the coffee particles and allowing release brewed coffee only when the predetermined temperature is obtained.

A still further object of the present invention is to provide a device as described above which includes a valve assembly which utilizes a bimetallic strip.

An even further object of the present invention is to provide a device as described above which utilizes a valve arrangement for maintaining water in contact with the coffee particles which valve arrangement allows release of the brewed coffee only when a predetermined pressure exists.

A still further object of the present invention is to provide a device as defined above which is easily manufactured and is simple to use.

These and other objects and advantages will become apparent from the following description of preferred embodiments of the invention taken together with the accompanying drawings.

DRAWINGS

The invention may take form in certain parts and arrangement of parts, embodiment of which are described in detail in the specification and illustrated in the accompanying drawings wherein.

Figure 1:
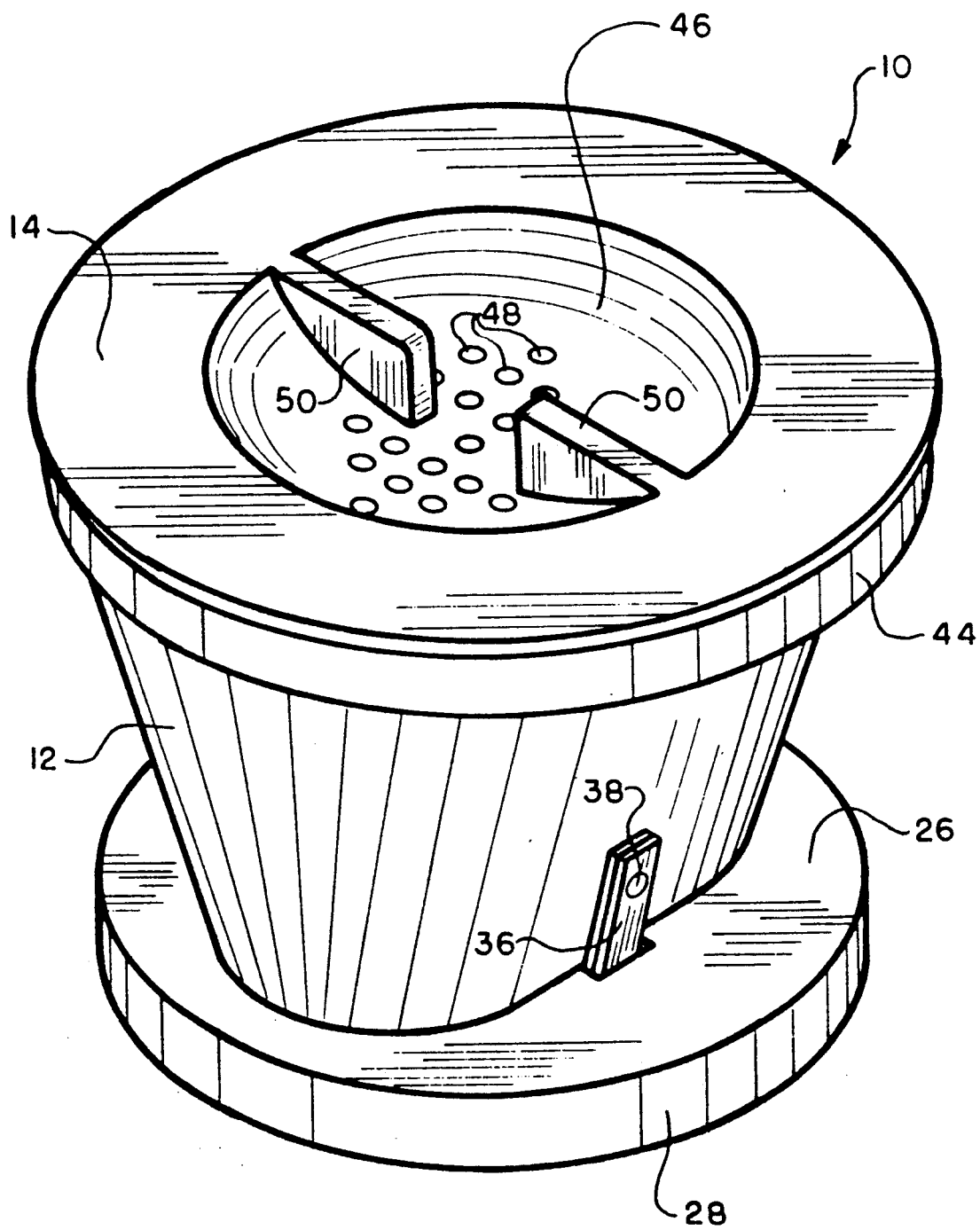
FIG. 1 is a perspective view of a microwave coffee maker illustrating a preferred embodiment of the present invention.
Figure 2:
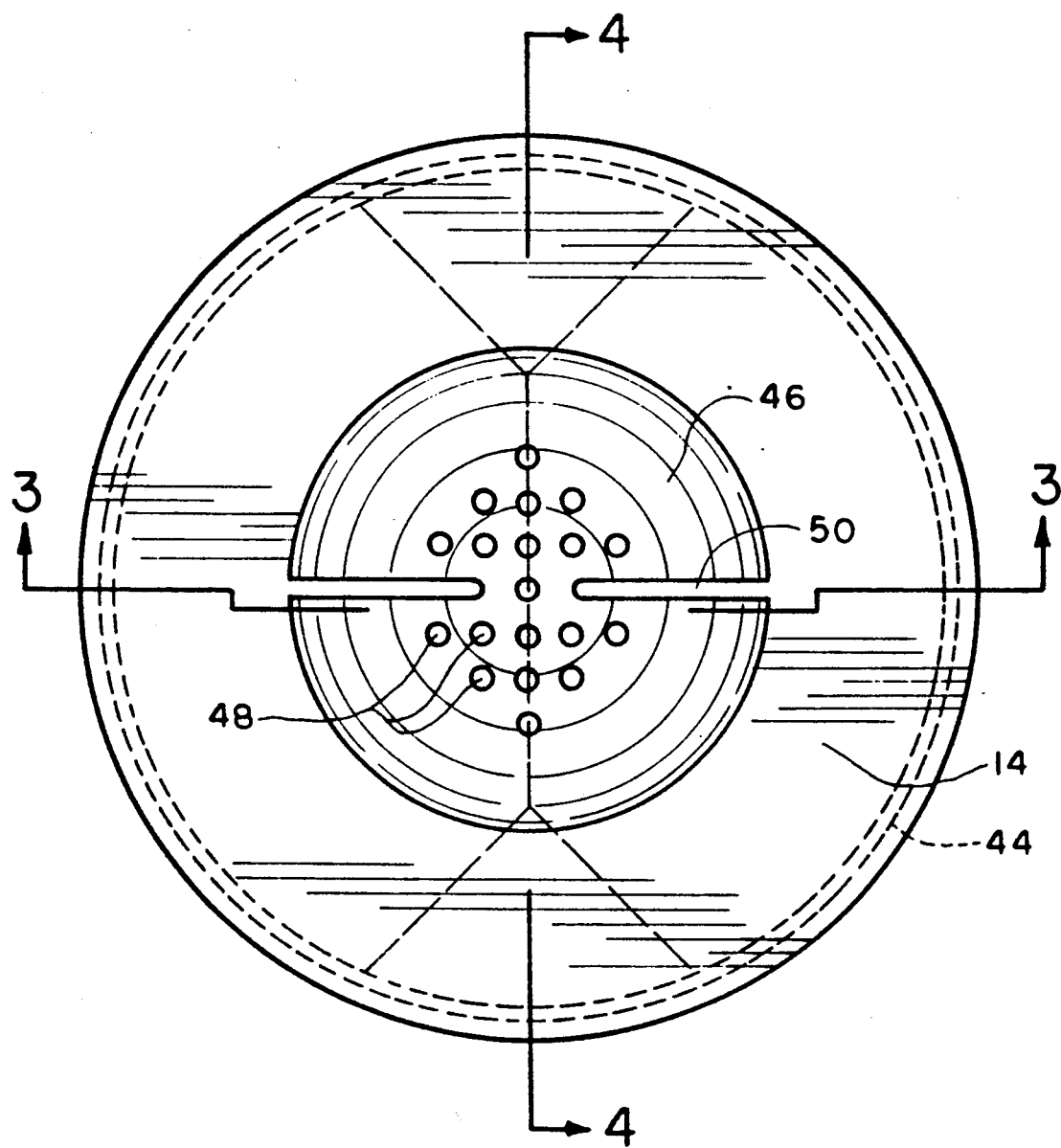
FIG. 2 is a top plan view of the coffee maker shown in FIG. 1.

Referring now to the drawings wherein the showings are for the purpose of illustrating preferred embodiments of the present invention, and not for the purpose of limiting same. FIG. 1 shows a microwave coffee maker 10 illustrating a preferred embodiment of the present invention. Coffee maker 10 is generally comprised of a reservoir 12 and a lid or cover 14. Reservoir 12 is generally funnel-shaped and includes an upper end 16 which defines a generally circular opening and a closed lower end 18 which is generally wedge-shaped and defines a generally straight edge 20. An aperture 22 is provided near lower end 18 of reservoir 12. Reservoir 12 defines an inner chamber 24, which according to the present invention, is preferably dimensioned to receive a conventionally known coffe filter which are typically used in drip coffee makers. In the embodiment shown, reservoir 12 and chamber 24 are dimensioned to receive a standard No. 4 coffee filter.

Coffee maker 10 includes a circular flange 26 which extends outwardly from reservoir 12. Flange 26 includes a downward extending lip 28 and is dimensioned to rest on the upper rim or edge of a typical mug or cup, shown in phantom in the drawings and designated 30. Flange 26 is positioned on reservoir 12 such that aperture 22 is positioned generally over or within cup or mug 30.

Figure 3:
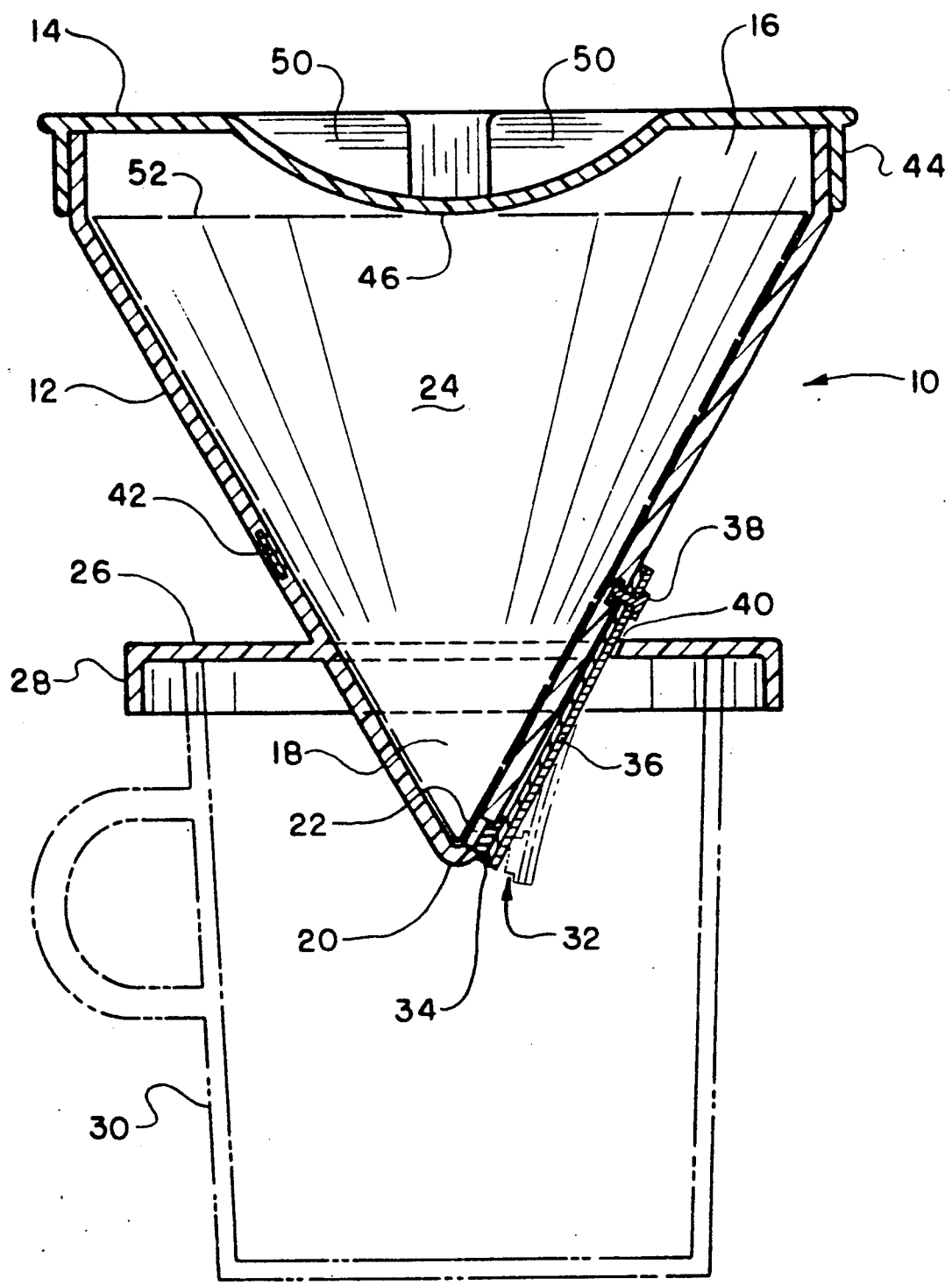
FIG. 3 is a sectional view taken along line 3—3 of FIG. 2.

In the embodiment shown in FIGS. 1-4, a valve arrangement 32 is provided to control the flow of liquid from reservoir 12 through aperture 22. Valve arrangement 32 is generally comprised of a plug 34 mounted to a bimetallic strip 36. Bimetallic strip 36 which is secured to the outer surface of reservoir 12 by a fastener element 38 and extends through an opening 40 formed in flange 26 as best seen in FIGS. 1 and 3. In the embodiment shown, bimetallic strip 36 has an actuation temperature of approximately 160° Fahrenheit, at which temperature strip 36 curves outwardly to a position as shown in phantom in FIG. 3 wherein plug 34 is withdrawn from aperture 22. In other words, valve assembly 32 is movable between the first position (best seen in FIG. 3) wherein plug 34 seals and prevents fluid flow through aperture 22 and a second position (shown in phantom in FIG. 3) wherein plug 34 is removed from aperture 22 and allows fluid to flow from reservoir 12 to cup 30.

Means for creating a "hot spot" within reservoir 12 are provided in the form of an element 42 formed from a lossy material imbedded within the wall which forms reservoir 12.

Lid 14 is generally circular in shape and includes a downward extending annular wall 44 dimensioned to correspond and snugly engage the upper end of reservoir 12. Lid 14 also includes a centrally located concave portion 46 having a plurality of apertures 48 formed therein. A pair of aligned tabs 50 extend upwardly from concave portion 46.

Reservoir 12 and lid 14 are preferably formed of a microwavable plastic material such as propylene.

Figure 4:
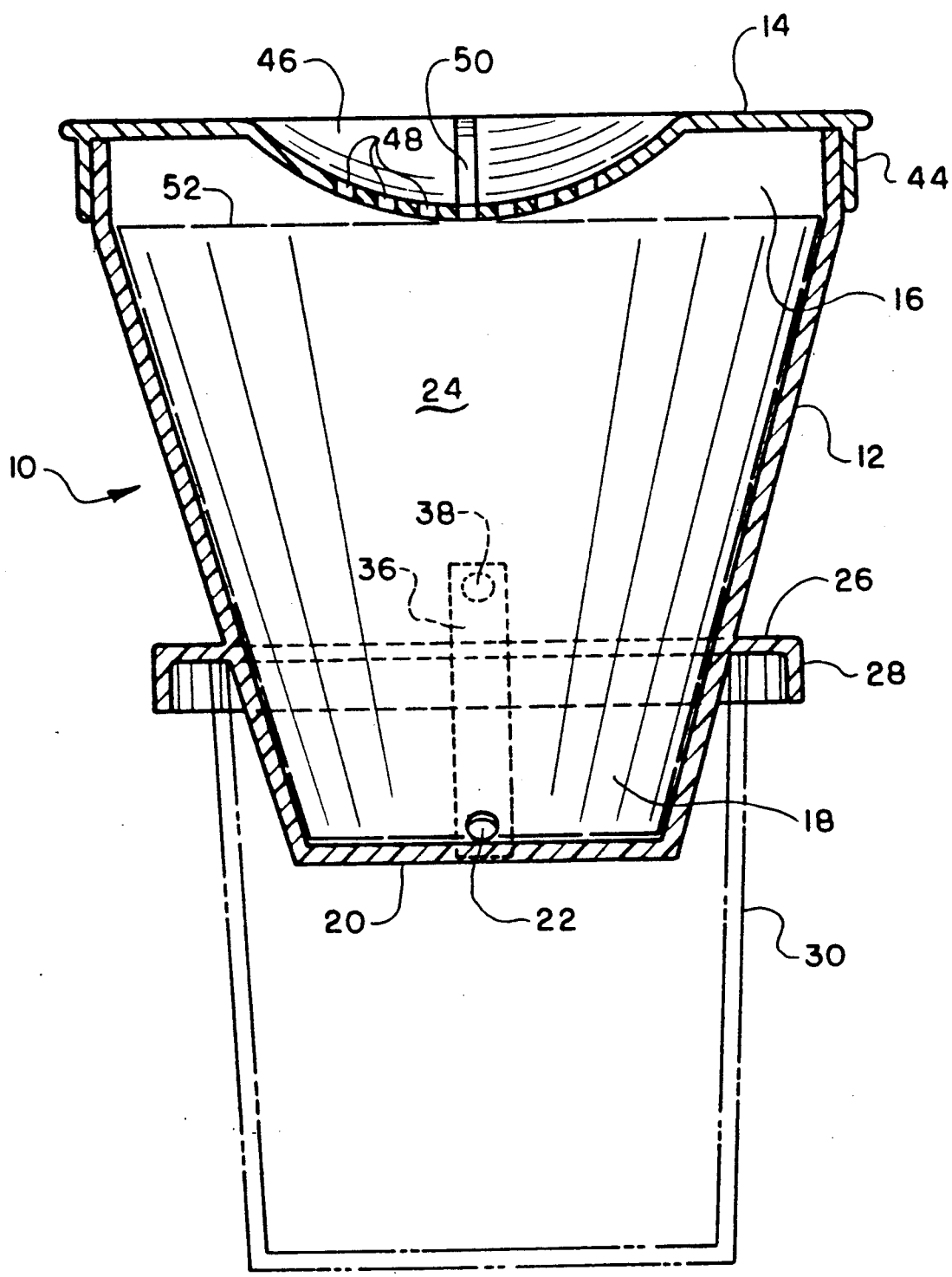
FIG. 4 is a sectional view taken along line 4—4 of FIG. 2.

Referring now to the operation of the present invention, coffee maker 10 is positioned over a conventionally known mug or cup 40 as shown in FIGS. 3 and 4. A coffee filter designated 52 and shown in phantom in FIG. 3 is placed within chamber 24 of reservoir 12. As indicated above, reservoir 12 and chamber 24 are preferably dimensioned to receive a standard number 6 coffee filter. A predetermined amount of ground coffee is placed into chamber 24 and filter 52, and lid 14 is placed on reservoir 12. A specific amount of water is then added to chamber 24 through apertures 48 in lid 14. Importantly, concave portion 46 and apertures 48 disperse the water uniformly over the coffee grounds in chamber 24. In this respect, the apertures generally produce a spray to wet the coffee particles. Chamber 24 is preferably dimensioned to contain sufficient water to produce a single serving of coffee to be received within cup 30. Plug 34 prevents the water in reservoir 12 from flowing through aperture 22 into cup 30. Coffee maker 10 together with cup 30 are placed in the microwave oven. The microwave oven is programmed to heat the water and coffee for a predetermined period of time which is determined by the type and intensity of the microwave oven used. As will be understood, the water within reservoir 12 is heated by the microwave energy. As the water temperature increases, extraction of coffee from the coffee particles results. Element 42 within the reservoir 12 produces a localized hot spot within chamber 24 of reservoir 12. It is believed that this hot spot produces current convection within the chamber to agitate the water and coffee particles during the brewing of the coffee. As the temperature of the water within chamber 24 increases, heat conveyed through the walls of reservoir 12 to bimetallic strip 36. As indicated above, bimetallic strip 36 has an actuation temperature of approximately 160° Fahrenheit. When strip 36 reaches 160° Fahrenheit, it moves to the open position, illustrated in phantom in FIG. 3. As will be appreciated, temperature transfer from chamber 24 to bimetallic strip 36 is not instantaneous, and the period of time is takes to heat strip 36 provides sufficient time for extraction of coffee from the coffee particles. Upon actuation of bimetallic strip 36, plug 34 is removed from aperture 22 wherein the brewed coffee within chamber 24 is allowed to flow therefrom into cup 30.

During the heating cycle, any moisture or steam generated within chamber 24 would normally collect on the inner surface of lid or cover 14. The concave portion 46 of lid 14 provides a means for forming droplets to return the liquid and moisture to chamber 24. Excessive steam and pressure may be vented through apertures 48 in lid 14.

Thus, according to the present invention, a small quantity of coffee may be quickly brewed in a microwave oven by a device which maintains the heated water in contact with the coffee particles for a predetermined period of time to enable maximum extraction from the coffee material. Importantly, once the water has reached a predetermined temperature, the brewed coffee is removed (i.e. released) from chamber 24. In this respect, further heating of the cup or mug merely increases the temperature of the brewed coffee without prolonging the extraction process, thereby providing a more uniform consistent production of coffee during each use.

Figure 5:
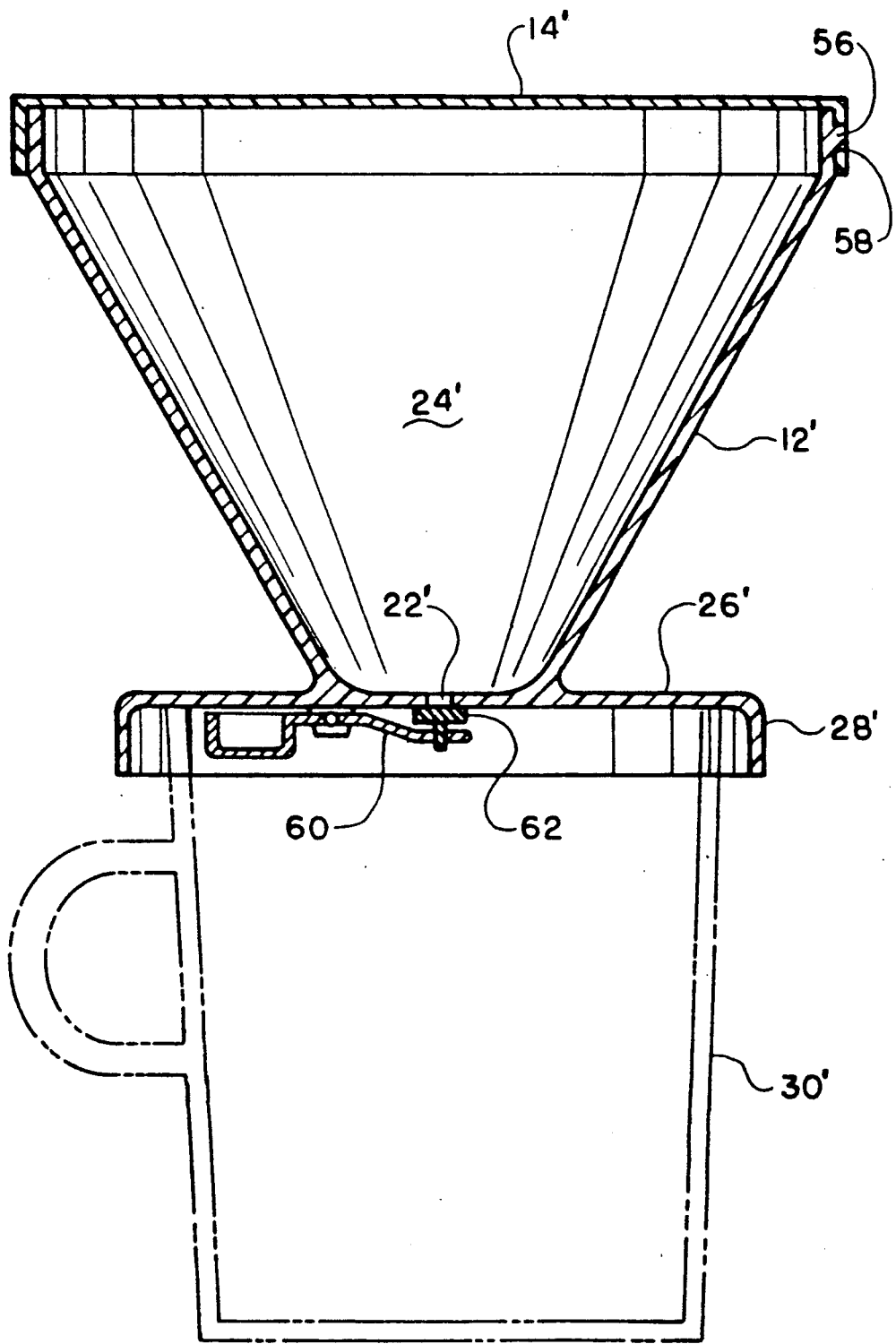
FIG. 5 is a sectional view of a microwave coffee maker illustrating a second embodiment of the present invention.

The present invention thus provides a coffee making device which is easy to use and which enables the brewing of single servings of coffee quickly. Although the invention has been described with respect to a preferred embodiment, modifications will be clear to others upon their reading and understanding of this invention. For example, FIG. 5 shows a coffee making device illustrating another embodiment of the present invention. In this embodiment, reservoir 12' includes a cap 14' which is designed to be secured to reservoir 12' in a manner wherein chamber 24 may be pressurized as a result of the heating of the water therein. In the embodiment shown, the upper edge of reservoir 12' includes a tab 56 dimensioned to be received within an opening 58 in lid 14'. The bimetallic valve arrangement disclosed in the previous embodiment is replaced by a valve arrangement 60 wherein a plug 62 is biased to a normally closed position as shown in FIG. 5. Valve arrangement 60 is operable to open upon a predetermined pressure being created within chamber 24' as a result of the water being heated therein. It is intended that this and all such modifications or alterations be included as they come within the scope of the patent as claims with equivalents thereof.

Having described the invention, the following is claimed:

1. An apparatus for brewing coffee with microwave energy comprising:
    a generally funnel-shaped reservoir of molded plastic construction having an open upper end, a closed lower end and an aperture near said closed lower end, said reservoir dimensioned to receive a filter of specific size and shape therein and to simultaneously hold a predetermined amount of coffee particulate and water therein,
    a removable cover for closing said opened upper end,
    flange means integrally molded to and extending outwardly from said reservoir, said flange means operable to rest said apparatus on the upper edge of a cup or mug with said aperture disposed within said cup or mug;
    means molded within said reservoir at a predetermined location to create a localized hot spot within said reservoir when exposed to microwave energy; and,
    valve means operable to control flow of liquid from said reservoir through said aperture, said valve means movable from a closed position wherein flow through said aperture is obstructed and an open position wherein flow through said aperture is allowed when a predetermined condition exists in said reservoir.

2. An apparatus as defined in claim 1 wherein said valve means includes a bimetallic element operable to move said valve means to said open position when a predetermined temperature exists within said reservoir.

3. An apparatus as defined in claim 1 wherein:
    said cover is dimensioned to seal said reservoir and to create a pressurizable chamber therein; and,
    said valve means is normally biased to said closed position and is operable to move to said open position when a predetermined pressure exists within said reservoir.

4. An apparatus as defined in claims 2 or 3 wherein said means to create a localized hot spot is comprised of a microwave absorbing element within said reservoir.

5. An apparatus for brewing coffee in a microwave oven comprising:
    a reservoir of molded plastic construction for holding water and coffee particulate, said reservoir being generally funnel-shaped and having a generally circular open upper end, a closed, wedge-shaped bottom end, and an aperture near the bottom thereof dimensioned to receive a standard coffee filter therein,
    a cover mounted over said reservoir,
    means for positioning said apparatus over a mug or cup wherein said aperture is positioned over said cup or mug; and,
    valve means for controlling the flow of water through said aperture, said valve means having a first position wherein said valve means obstructs said aperture, said valve means further including a bimetallic strip secured to said reservoir which is operable to move said valve means to a second position which allows flow through said aperture when said bimetallic strip reaches a predetermined temperature.

6. An apparatus as defined in claim 5 wherein said reservoir includes a microwave absorbing element within said reservoir operable to create a localized hot spot within said reservoir when exposed to microwave energy to create a hot spot in said reservoir.

7. An apparatus as defined in claim 5 wherein said means for positioning is a flange laterally extending from said reservoir.

8. An apparatus for brewing coffee in a microwave oven comprising:
    a reservoir of molded plastic construction having an open upper end, a closed lower end, and an aperture near said lower end;
    a cover dimensioned to seal said reservoir to create a pressurizable chamber therein;
    means for positioning said apparatus over a mug or cup wherein said aperture is position over said cup or mug;
    means molded within said reservoir at a predetermined location to create a localized hot spot within said reservoir when exposed to microwave energy; and,
    valve means for controlling the flow of water through said aperture, said valve means being biased to a normally closed position and operable to move to an open position when pressure within said reservoir reaches a predetermined pressure.

9. An apparatus as defined in claim 8 wherein said reservoir is generally funnel-shaped and has a generally circular open upper end and a closed, conical-shaped bottom end.

10. An apparatus as defined in claims 8 or 9 wherein said means to create a hot spot in said reservoir is comprised of a microwave absorbing element within said reservoir.

11. An apparatus as defined in claim 8 wherein said means for positioning is a flange laterally extending from said reservoir.

12. An apparatus for brewing coffee with microwave energy comprising:

a reservoir of molded plastic construction having a closed lower end and an aperture near said closed lower end, said reservoir dimensioned to receive a filter, a predetermined amount of coffee particulate and water, support means extending outwardly from said reservoir operable to rest said apparatus on the upper edge of a cup or mug with said aperture disposed within said cup or mug;

means molded within said reservoir at a predetermined location to create a localized hot spot within said reservoir when exposed to microwave energy; and, heat actuated valve means operable to control flow of liquid from said reservoir through said aperture, said valve means movable from a closed position wherein flow through said aperture is obstructed and an open position wherein flow through said aperture is allowed when a predetermined temperature exists in said reservoir.

13. An apparatus as defined in claim 12 wherein said valve means includes a thermostat operable to move said valve means to said open position when a predetermined temperature exists within said reservoir.

14. An apparatus for brewing coffee in a microwave oven comprising:

a reservoir of molded plastic construction for holding water and coffee particulate, said reservoir being generally funnel-shaped and having a generally circular open upper end, a closed, wedge-shaped bottom end and an aperture near the bottom thereof dimensioned to receive a Standard No. 4 coffee filter, a cover mounted over said reservoir, means for positioning said apparatus over a mug or cup wherein said aperture is positioned over said cup or mug; and, valve means for controlling the flow of water through said aperture, said valve means having a first position wherein said valve means obstructs said aperture, said valve means further including a bimetallic element which is operable to move said valve means to a second position which allows flow through said aperture when said bimetallic element reaches a predetermined temperature.

* * * * *